United States Patent
Ahmed et al.

(10) Patent No.: US 12,225,628 B2
(45) Date of Patent: Feb. 11, 2025

(54) PART 1 OF REMOTE SIM PROVISIONING OF A SUBSCRIBER ENTITY

(71) Applicant: Telefonaktiebolaget LM Ericsson (publ), Stockholm (SE)

(72) Inventors: Abu Shohel Ahmed, Espoo (FI); Patrik Salmela, Espoo (FI); Kazi Wali Ullah, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 83 days.

(21) Appl. No.: 17/624,300

(22) PCT Filed: Jul. 3, 2019

(86) PCT No.: PCT/EP2019/067835
§ 371 (c)(1),
(2) Date: Dec. 31, 2021

(87) PCT Pub. No.: WO2021/001035
PCT Pub. Date: Jan. 7, 2021

(65) Prior Publication Data
US 2022/0360970 A1    Nov. 10, 2022

(51) Int. Cl.
*H04W 8/20* (2009.01)
*H04W 12/30* (2021.01)

(52) U.S. Cl.
CPC ........... *H04W 8/205* (2013.01); *H04W 12/35* (2021.01)

(58) Field of Classification Search
CPC .............................. H04W 8/205; H04W 12/35
(Continued)

(56) References Cited

U.S. PATENT DOCUMENTS

2015/0296378 A1* 10/2015 Plestid ................ H04W 8/12
  455/411
2017/0280321 A1*  9/2017 Caceres ................ G06F 21/34
(Continued)

FOREIGN PATENT DOCUMENTS

CN        102711108 A   * 10/2012
EP        3512224 A1      7/2019
(Continued)

OTHER PUBLICATIONS

International Search Report and Written Opinion of the International Searching Authority, PCT/EP2019/067835, mailed Jan. 14, 2020, 17 pages.
(Continued)

*Primary Examiner* — Nghi H Ly
(74) *Attorney, Agent, or Firm* — Sonoda & Kobayashi Intellectual Property Law; Sarvajit S. Patil

(57) ABSTRACT

There is provided mechanisms for remote provisioning of a SIM profile to a subscriber entity. A method is performed by a remote SIM provisioning server. The method includes obtaining a request from an MNO entity for generation of the SIM profile. The method includes generating the SIM profile. The method includes providing, to a storage entity, a key-value pair of the SIM profile. The key-value pair includes a unique identifier including at least one profile specific element of the SIM profile as key and binding information of the at least one profile specific element as value. The unique identifier including at least one profile specific element of the SIM profile is represented by an ICCID of the SIM profile. The binding information of the at least one profile specific element is represented by an EID and profile/subscription unique data elements for the SIM profile.

20 Claims, 8 Drawing Sheets

(58) Field of Classification Search
USPC .................. 455/419, 418, 410, 411, 558, 423
See application file for complete search history.

(56) References Cited

U.S. PATENT DOCUMENTS

| | | | |
|---|---|---|---|
| 2018/0014178 A1* | 1/2018 | Baek | ................... H04W 8/20 |
| 2019/0074983 A1 | 3/2019 | Yang et al. | |
| 2019/0191298 A1 | 6/2019 | Kim et al. | |
| 2022/0360994 A1* | 11/2022 | Ahmed | ............... H04W 12/40 |

FOREIGN PATENT DOCUMENTS

| | | |
|---|---|---|
| WO | WO 2018/018419 A1 | 2/2018 |
| WO | WO 2018/048278 A1 | 3/2018 |
| WO | WO 2019/009557 A1 | 1/2019 |

OTHER PUBLICATIONS

GSM Association, Official Document SGP.22—RSP Technical Specification, Version 2.2, Sep. 1, 2017, 264 pages.
GSM Association, Official Document SGP.22—RSP Technical Specification, Version 2.2.1, Dec. 18, 2018, (XP055653673) 250 pages.

* cited by examiner

PART 1 OF REMOTE SIM PROVISIONING OF A SUBSCRIBER ENTITY

CROSS REFERENCE TO RELATED APPLICATIONS

This application is a 35 U.S.C. § 371 national stage application of PCT International Application No. PCT/EP2019/067835 filed on Jul. 3, 2019, the disclosure and content of which is incorporated by reference herein in its entirety.

TECHNICAL FIELD

Embodiments presented herein relate to methods, a remote SIM provisioning server, a storage entity, a subscriber entity, an MNO entity, computer programs, and a computer program product for remote provisioning of a SIM profile to the subscriber entity.

BACKGROUND

Remote SIM provisioning (RSP; where SIM is short for subscriber identity module) for consumer devices is described in "SGP.22—RSP Technical Specification", Version 2.2.1, 18 Dec. 2018, published by the GSM Association (GSMA). According to this document, the subscriber entity first makes a contract with a mobile network operator (MNO). Secondly, optionally, the subscriber entity requests profile download from the MNO. Thirdly, the subscriber entity downloads a subscription profile from a server (enhanced Subscription Manager Data Preparation (SM-DP+) server) to the embedded universal integrated circuit card (eUICC) in the communication device to be provisioned. Section 3.1 of the aforementioned document describes the profile download initiation process. It indicates how the user orders a subscription from the MNO. Request/response methods are used for the MNO to request the SM-DP+ to generate a SIM profile. After profile generation, the subscriber entity can download the generated profile by contacting the SM-DP+ using the communication device. The communication device is assumed to comprise a local profile assistant (LPA) and the eUICC. The LPA acts as a proxy between the SM-DP+ and the eUICC during profile download.

In the RSP trust model, the GSMA certificate issuer (CI) issues certificates for SM-DP+ servers and eUICC manufacturers (EUMs) which in turn issue certificate for the eUICCs. The trust is established between the eUICC and the SM-DP+ server based on their respective certificate and the trust chain established from the GSMA CI. In this model, an MNO can make a profile order to any SM-DP+ provider for a SIM profile generation and target it to any eUICC. An attacker with control of an SM-DP+ provider might generate a SIM profile and thus be able to target the SIM profile for any eUICC. With the increasing number of SM-DP+ providers, any malicious SM-DP+ provider might cause significant harm to the RSP trust model. Current manual audit and forensics based detection mechanisms are slow to respond to such attack scenarios. The current trust model lacks auditability for a provisioned profile and thus makes it cumbersome for an auditor to monitor provisioned profiles by an SM-DP+ server. Some examples of attacks a malicious SM-DP+ server could perform are presented next.

A malicious SM-DP+ server could clone a valid international mobile subscriber identity (IMSI) and key pair from an earlier provisioned one and retarget it to a new eUICC. This causes billing and/or subscriber identity fraud. Currently, neither the eUICC nor the MNO is capable of to reliably detect such an attack i.e., if the same IMSI and key is installed in multiple eUICCs.

A malicious SM-DP+ server could prepare profiles for a set of IMSIs with an invalid key pair for a set of eUICCs. A malicious SM-DP+ server could trick the user to download the SIM profile or can register such a SIM profile in a discovery server (SM-DS) and let the user download the SIM profile to the eUICC. When a large number of communication devices with invalid IMSI and subscriber keys request to connect to the network of the MNO, this could create large amounts of traffic. Further, an MNO might block all IMSIs with invalid subscriber keys, resulting in service denial even for the valid subscriptions using those blocked IMSIs.

A malicious SM-DP+ server could create SIM profiles for a particular eUICC and trick the user to download those SIM profiles. By downloading many SIM profiles, this might exhaust the memory of the targeted eUICC.

These types of attacks generally require tricking the user of the eUICC to download a profile from the malicious SM-DP+ server. Users can be tricked to do this in many ways, for example by means of phishing mail or by events being registered to the SM-DS. In some setups, the LPA might be configured to automatically download a SIM profile from the SM-DP+ server by querying the default SM-DP+ address or a discovery server address.

In view of the above, there is a need for improved remote provisioning of SIM profiles to subscriber entities, such as eUICCs.

SUMMARY

An object of embodiments herein is to provide efficient remote provisioning of a SIM profile to a subscriber entity.

According to a first aspect there is presented a method for remote provisioning of a SIM profile to a subscriber entity. The method is performed by a remote SIM provisioning server. The method comprises obtaining a request from an MNO entity for generation of the SIM profile. The method comprises generating the SIM profile. The method comprises providing, to a storage entity, a key-value pair of the SIM profile. The key-value pair comprises a unique identifier comprising at least one profile specific element of the SIM profile as key and binding information of the at least one profile specific element as value. The unique identifier comprising at least one profile specific element of the SIM profile is represented by an ICCID of the SIM profile. The binding information of the at least one profile specific element is represented by an EID and profile/subscription unique data elements for the SIM profile. The method comprises providing, to the subscriber entity requesting download of the SIM profile, the SIM profile.

According to a second aspect there is presented a remote SIM provisioning server for remote provisioning of a SIM profile to a subscriber entity. The remote SIM provisioning server comprises processing circuitry. The processing circuitry is configured to cause the remote SIM provisioning server to obtain a request from an MNO entity for generation of the SIM profile. The processing circuitry is configured to cause the remote SIM provisioning server to generate the SIM profile. The processing circuitry is configured to cause the remote SIM provisioning server to provide, to a storage entity, a key-value pair of the SIM profile. The key-value pair comprises a unique identifier comprising at least one profile specific element of the SIM profile as key and binding information of the at least one profile specific element as value. The unique identifier comprising at least one profile specific element of the SIM profile is represented by an ICCID of the SIM profile. The binding information of the at least one profile specific element is represented by an EID and profile/subscription unique data elements for the SIM profile. The processing circuitry is configured to cause the remote SIM provisioning server to provide, to the subscriber entity requesting download of the SIM profile, the SIM profile.

According to a third aspect there is presented a computer program for remote provisioning of a SIM profile to a subscriber entity. The computer program comprises computer program code which, when run on processing circuitry of a remote SIM provisioning server, causes the remote SIM provisioning server to perform a method according to the first aspect.

According to a fourth aspect there is presented a method for remote provisioning of a SIM profile to a subscriber entity. The method is performed by a storage entity. The method comprises obtaining, from a remote SIM provisioning server, a key-value pair of the SIM profile. The key-value pair comprises a unique identifier comprising at least one profile specific element of the SIM profile as key and of binding information of the at least one profile specific element as value. The unique identifier comprising at least one profile specific element of the SIM profile is represented by an ICCID of the SIM profile. The binding information of the at least one profile specific element is represented by an EID and profile/subscription unique data elements for the SIM profile. The method comprises providing, to the subscriber entity presenting the key of the key-value pair, the value of the key-value pair.

According to a fifth aspect there is presented a storage entity for remote provisioning of a SIM profile to a subscriber entity. The storage entity comprises processing circuitry. The processing circuitry is configured to cause the storage entity to obtain, from a remote SIM provisioning server, a key-value pair of the SIM profile. The key-value pair comprises a unique identifier comprising at least one profile specific element of the SIM profile as key and of binding information of the at least one profile specific element as value. The unique identifier comprising at least one profile specific element of the SIM profile is represented by an ICCID of the SIM profile. The binding information of the at least one profile specific element is represented by an EID and profile/subscription unique data elements for the SIM profile. The processing circuitry is configured to cause the storage entity to provide, to the subscriber entity presenting the key of the key-value pair, the value of the key-value pair.

According to a sixth aspect there is presented a computer program for remote provisioning of a SIM profile to a subscriber entity. The computer program comprises computer program code which, when run on processing circuitry of a storage entity, causes the storage entity to perform a method according to the fourth aspect.

According to a seventh aspect there is presented a method for remote provisioning of a SIM profile to a subscriber entity. The method is performed by the subscriber entity. The method comprises obtaining, from a remote SIM provisioning server, the SIM profile upon requesting download of the SIM profile. The method comprises comparing a locally computed value of a key-value pair of the SIM profile to a value of the key-value pair as downloaded from a storage entity. The key-value pair comprises a unique identifier comprising at least one profile specific element of the SIM profile as key and binding information of the at least one profile specific element as value. The unique identifier comprising at least one profile specific element of the SIM profile is represented by an ICCID of the SIM profile. The binding information of the at least one profile specific element is represented by an EID and profile/subscription unique data elements for the SIM profile. The method comprises accepting the SIM profile as valid only when the locally computed value matches the downloaded value.

According to an eight aspect there is presented a subscriber entity for remote provisioning of a SIM profile to the subscriber entity. The subscriber entity comprises processing circuitry. The processing circuitry is configured to cause the subscriber entity to obtain, from a remote SIM provisioning server, the SIM profile upon requesting download of the SIM profile. The processing circuitry is configured to cause the subscriber entity to compare a locally computed value of a key-value pair of the SIM profile to a value of the key-value pair as downloaded from a storage entity. The key-value pair comprises a unique identifier comprising at least one profile specific element of the SIM profile as key and binding information of the at least one profile specific element as value. The unique identifier comprising at least one profile specific element of the SIM profile is represented by an ICCID of the SIM profile. The binding information of the at least one profile specific element is represented by an EID and profile/subscription unique data elements for the SIM profile. The processing circuitry is configured to cause the subscriber entity to accept the SIM profile as valid only when the locally computed value matches the downloaded value.

According to a tenth aspect there is presented a computer program for remote provisioning of a SIM profile to a subscriber entity. The computer program comprises computer program code which, when run on processing circuitry of a subscriber entity, causes the subscriber entity to perform a method according to the seventh aspect.

According to an eleventh aspect there is presented a method for remote provisioning of a SIM profile to a subscriber entity. The method is performed by an MNO entity. The method comprises providing a request to a remote SIM provisioning server for generation of the SIM profile. The method comprises obtaining a value of a key-value pair of the SIM profile from a storage entity upon presenting the key of the key-value pair to the storage entity. The key-value pair comprises at least one profile specific element of the SIM profile as key and binding information of the at least one profile specific element as value. The unique identifier comprising at least one profile specific element of the SIM profile is represented by an ICCID of the SIM profile. The binding information of the at least one profile specific element is represented by an EID and profile/subscription unique data elements for the SIM profile. The method comprises comparing another obtained or locally computed value of the key-value pair to the obtained value of the key-value pair. The method comprises, when said another obtained or locally computed value is not identical to the obtained value, performing a predetermined action.

According to a twelfth aspect there is presented an MNO entity for remote provisioning of a SIM profile to a subscriber entity. The MNO entity comprises processing circuitry. The processing circuitry is configured to cause the MNO entity to provide a request to a remote SIM provisioning server for generation of the SIM profile. The processing circuitry is configured to cause the MNO entity to obtain a value of a key-value pair of the SIM profile from a storage entity upon presenting the key of the key-value pair to the storage entity. The key-value pair comprises at least one profile specific element of the SIM profile as key and binding information of the at least one profile specific element as value. The unique identifier comprising at least one profile specific element of the SIM profile is represented by an ICCID of the SIM profile. The binding information of the at least one profile specific element is represented by an EID and profile/subscription unique data elements for the SIM profile. The processing circuitry is configured to cause the MNO entity to compare another obtained or locally computed value of the key-value pair to the obtained value of the key-value pair. The processing circuitry is configured to cause the MNO entity to, when said another obtained or locally computed value is not identical to the obtained value, perform a predetermined action.

According to a thirteenth aspect there is presented a computer program for remote provisioning of a SIM profile to a subscriber entity, the computer program comprising computer program code which, when run on processing circuitry of an MNO entity, causes the MNO entity to perform a method according to the eleventh aspect.

According to a fourteenth aspect there is presented a computer program product comprising a computer program according to at least one of the third aspect, the sixth aspect, the tenth aspect, and the thirteenth aspect, and a computer readable storage medium on which the computer program is stored. The computer readable storage medium can be a non-transitory computer readable storage medium.

Advantageously these methods, these remote SIM provisioning servers, these storage entities, these subscriber entities, these MNO entities, and these computer programs provide SIM profile transparency.

Advantageously these methods, these remote SIM provisioning servers, these storage entities, these subscriber entities, these MNO entities, and these computer programs efficiently mitigate the attack scenarios described above.

Advantageously these methods, these remote SIM provisioning servers, these storage entities, these subscriber entities, these MNO entities, and these computer programs provide auditability for each provisioned profile.

Advantageously, the subscriber entity is ensured that SIM profiles are not accepted without a proof of inclusion in the storage entity. The MNO entity is enabled to monitor all published ICCIDs (as defined by respective values of the key-value pair) within its range. A mismatch check between any ICCID published in the storage entity compared to the one or more ordered by the MNO entity allows for detection of cloning and mis-issuance of a SIM profile by a specific remote SIM provisioning server. By means of the value of the key-value pair, the subscriber entity can verify that the downloaded profile matches what has been registered in the storage entity.

Advantageously these methods, these remote SIM provisioning servers, these storage entities, these subscriber entities, these MNO entities, and these computer programs detect targeted attack using crafted SIM profiles towards a subscriber entity.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
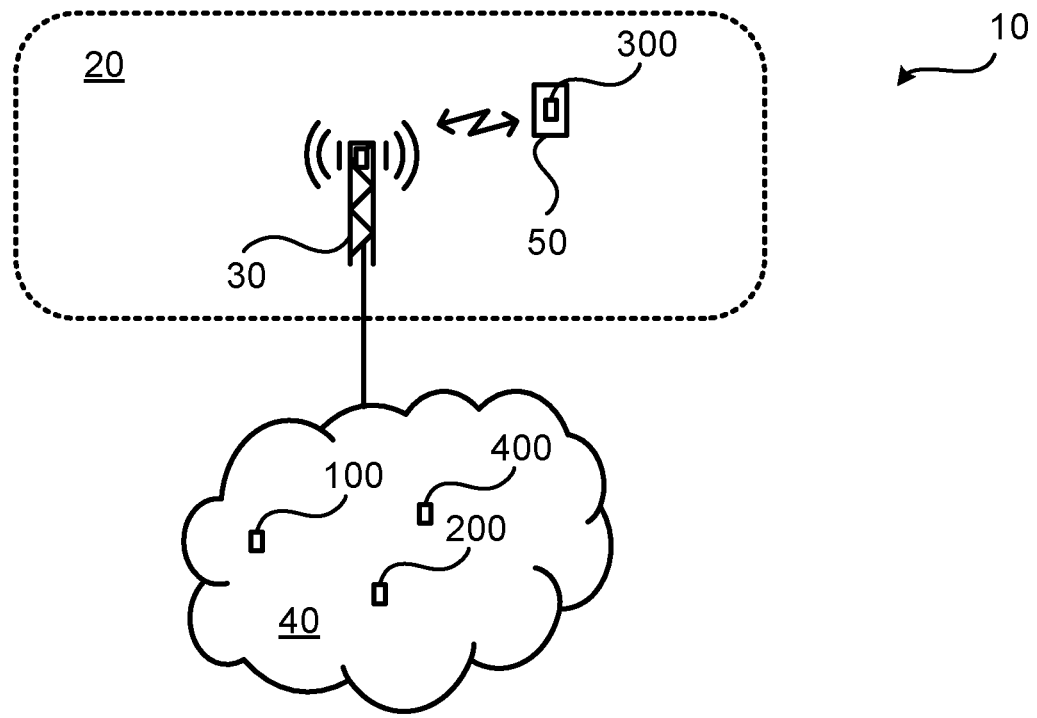
FIG. 1 is a schematic diagram illustrating a communication network according to embodiments.

FIG. 1 is a schematic diagram illustrating a communications network 10 where embodiments presented herein can be applied. The communications network 10 comprises a radio access network 20 and a combined core network and service network 40. In turn, the radio access network 20 comprises a radio access network node 30, and the combined core network and service network 40 comprises a remote SIM provisioning server 100, a storage entity 200, and an MNO entity 400. The radio access network node 30 provides network access to, and thus serves, a terminal device 50. In turn, the terminal device 50 comprises a subscriber entity 300. In some examples the subscriber entity 300 is an eUICC. In some examples the remote SIM provisioning server 100 is an SM-DP+ entity. In some examples the storage entity 200 is a server, for example holding an immutable audit record. In some examples the subscriber entity 300 is an integrated universal integrated circuit card (iUICC) or an eUICC. The terminal device 50 could be any of a user equipment (UE), network equipped vehicle, network equipped sensor, or a so-called Internet of Things (IoT) device. As the skilled person understands, the radio access network 20 as well as combined core network and service network 40 might comprise a plurality of functions, nodes, devices, and entities for facilitating communication between the terminal device 50 and the combined core network and service network 40.

As noted above, there is a need for improved remote provisioning of SIM profiles to subscriber entities 300, such as eUICCs or iUICCs.

The embodiments disclosed herein thus relate to mechanisms for remote provisioning of a SIM profile to a subscriber entity 300. In order to obtain such mechanisms there is provided a remote SIM provisioning server 100, a method performed by the remote SIM provisioning server 100, a computer program product comprising code, for example in the form of a computer program, that when run on processing circuitry of the remote SIM provisioning server 100, causes the remote SIM provisioning server 100 to perform the method. In order to obtain such mechanisms there is further provided a storage entity 200, a method performed by the storage entity 200, and a computer program product comprising code, for example in the form of a computer program, that when run on processing circuitry of the storage entity 200, causes the storage entity 200 to perform the method. In order to obtain such mechanisms there is further provided a subscriber entity 300, a method performed by the subscriber entity 300, and a computer program product comprising code, for example in the form of a computer program, that when run on processing circuitry of the subscriber entity 300, causes the subscriber entity 300 to perform the method. In order to obtain such mechanisms there is further provided an MNO entity 400, a method performed by the MNO entity 400, and a computer program product comprising code, for example in the form of a computer program, that when run on processing circuitry of the MNO entity 400, causes the MNO entity 400 to perform the method.

Figure 2:
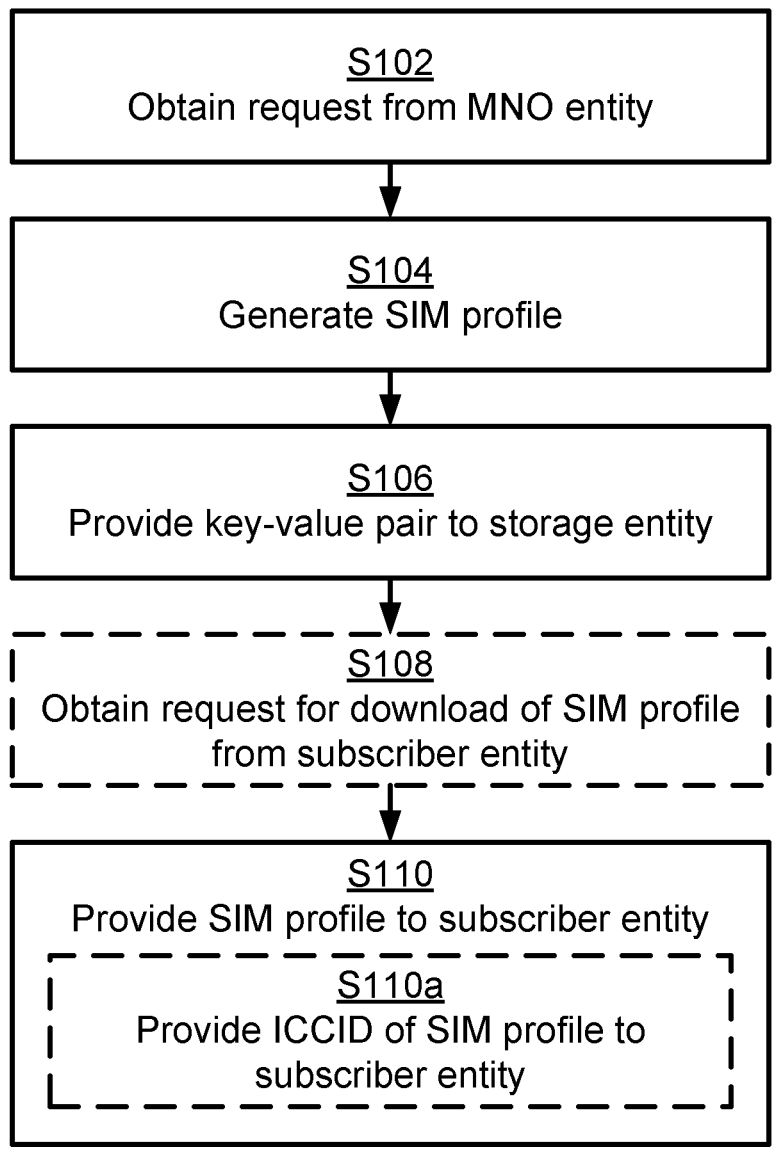
FIGS. 2, 3, 4, and 5 are flowcharts of methods according to embodiments.

Reference is now made to FIG. 2 illustrating a method for remote provisioning of a SIM profile to a subscriber entity 300 as performed by the remote SIM provisioning server 100 according to an embodiment.

S102: The remote SIM provisioning server 100 obtains a request from an MNO entity 400 for generation of the SIM profile.

S104: The remote SIM provisioning server 100 generates the SIM profile.

S106: The remote SIM provisioning server 100 provides, to a storage entity 200, a key-value pair of the SIM profile. The key-value pair comprises a unique identifier comprising at least one profile specific element of the SIM profile as key and binding information of the at least one profile specific element as value. The unique identifier comprising at least one profile specific element of the SIM profile is represented by an ICCID of the SIM profile. The binding information of the at least one profile specific element is represented by an EID (i.e., the identity of the subscriber entity 300) and profile/subscription unique data elements for the SIM profile.

S110: The remote SIM provisioning server 100 provides, to the subscriber entity 300 requesting download of the SIM profile, the SIM profile.

Embodiments relating to further details of remote provisioning of a SIM profile to a subscriber entity 300 as performed by the remote SIM provisioning server 100 will now be disclosed.

Non-limiting examples of profile/subscription unique data are: profile identifier (given by the Integrated Circuit Card Identifier; ICCID, i.e., an identifier of the actual SIM card itself), subscriber identifier (given by the IMSI), subscriber key (Ki), and Operator key (OPc). The ICCID uniquely identifies a SIM profile. The subscriber identifier (given by the IMSI), subscriber key (Ki), and Operator key (OPc) uniquely identifies a subscription. A triplet (IMSI, Ki, OPc) can be defined as a unique subscription, considering that the same IMSI might be reused for a different subscription. During profile download the profile is bound to an eUICC (EID). A SIM profile might thus comprise such profile/subscription unique data. A protected SIM profile is thus one example of profile/subscription unique data.

There may be different triggers for the remote SIM provisioning server 100 to provide the SIM profile to the subscriber entity 300. In some aspects, an explicit request for download of the SIM profile as received from the subscriber entity 300 triggers the provision of the SIM profile to the subscriber entity 300. That is, according to an embodiment, the remote SIM provisioning server 100 is configured to perform (optional) step S108:

S108: The remote SIM provisioning server 100 obtains, from the subscriber entity 300, a request for download of the SIM profile.

The SIM profile is then provided to the subscriber entity 300 in response thereto.

There could be further data or information that is provided to the subscriber entity 300 together with the SIM profile in S110. For example, an ICCID of the SIM profile could be provided to the subscriber entity 300 together with the SIM profile in S110. That is, according to an embodiment, the remote SIM provisioning server 100 is configured to perform (optional) step S110*a* as part of S110:

S110*a*: The remote SIM provisioning server 100 provides, to the subscriber entity 300, an ICCID of the SIM profile when providing the SIM profile.

Figure 3:
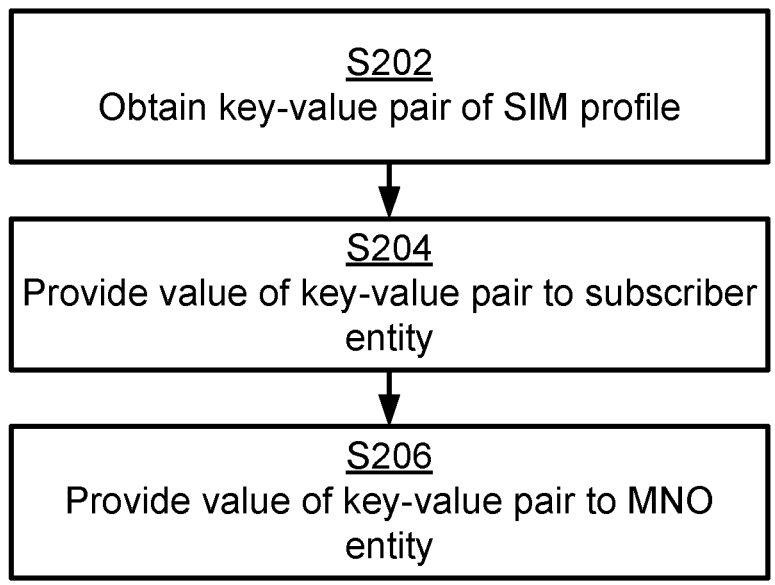

Reference is now made to FIG. 3 illustrating a method for remote provisioning of a SIM profile to a subscriber entity 300 as performed by the storage entity 200 according to an embodiment.

S202: The storage entity 200 obtains, from a remote SIM provisioning server 100, a key-value pair of the SIM profile. As above, the key-value pair comprises a unique identifier comprising at least one profile specific element of the SIM profile as key and binding information of the at least one profile specific element as value. The unique identifier comprising at least one profile specific element of the SIM profile is represented by an ICCID of the SIM profile. The binding information of the at least one profile specific element is represented by an EID and profile/subscription unique data elements for the SIM profile.

S204: The storage entity 200 provides, to the subscriber entity 300 presenting the key of the key-value pair, the value of the key-value pair.

Embodiments relating to further details of remote provisioning of a SIM profile to a subscriber entity 300 as performed by the storage entity 200 will now be disclosed.

It is understood that the ICCID of the SIM profile should be in a valid range of ICCIDs of the MNO entity 400.

In some aspects, the value of the key-value pair is also provided to the MNO entity 400. This requires the MNO entity 400 to present the key of the key-value pair to the storage entity 200 for the storage entity 200 to provide the value of the key-value pair to the MNO entity 400. That is, according to an embodiment, the storage entity 200 is configured to perform (optional) step S206:

S206: The storage entity 200 provides, to an MNO entity 400 presenting the key of the key-value pair, the value of the key-value pair.

Figure 4:
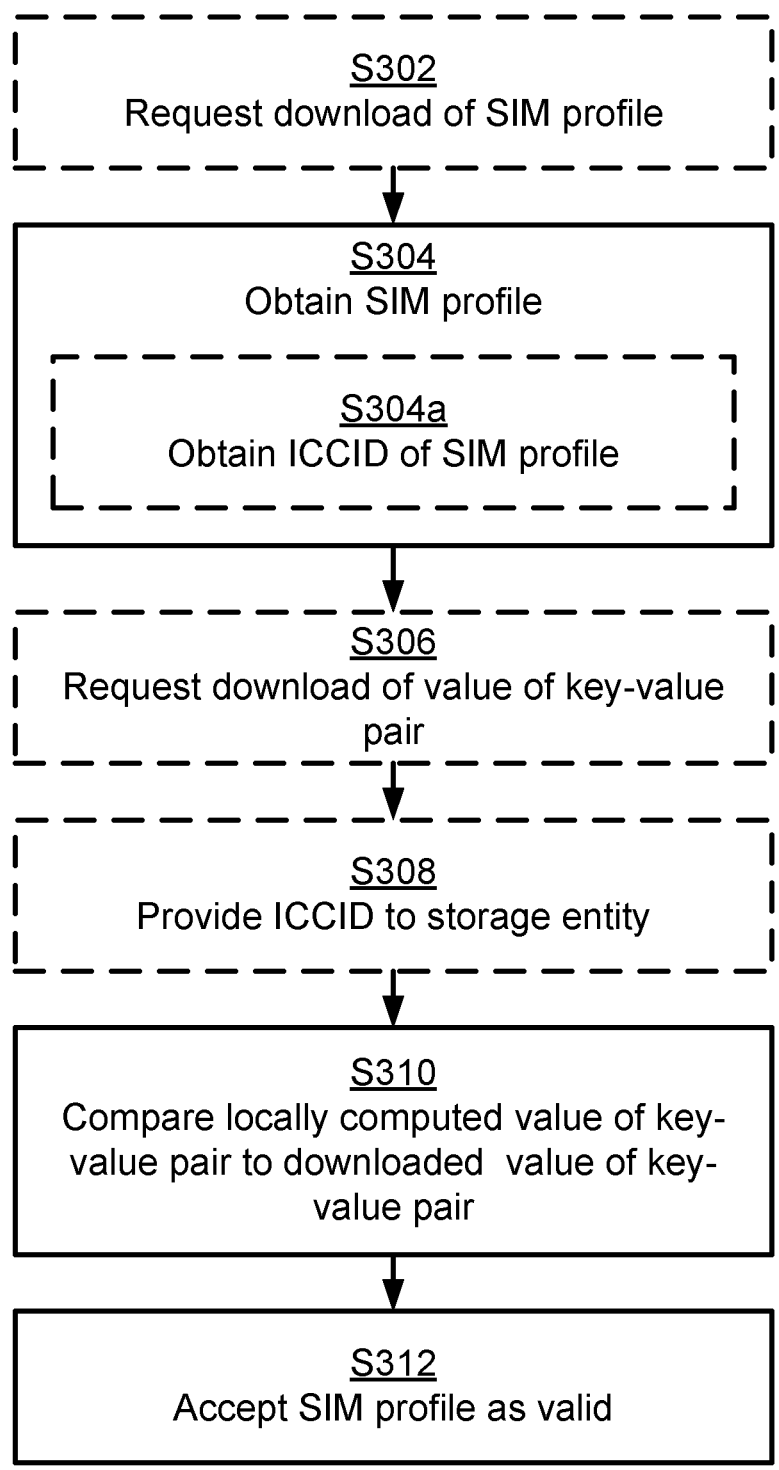

Reference is now made to FIG. 4 illustrating a method for remote provisioning of a SIM profile to a subscriber entity 300 as performed by the subscriber entity 300 according to an embodiment.

S304: The subscriber entity 300 obtains, from a remote SIM provisioning server 100, the SIM profile upon requesting download of the SIM profile.

S310: The subscriber entity 300 compares a locally computed value of a key-value pair of the SIM profile to a value of the key-value pair as downloaded from a storage entity 200. As above, the key-value pair comprises a unique identifier comprising at least one profile specific element of the SIM profile as key and binding information of the at least one profile specific element as value. The unique identifier comprising at least one profile specific element of the SIM profile is represented by an ICCID of the SIM profile. The binding information of the at least one profile specific element is represented by an EID and profile/subscription unique data elements for the SIM profile.

S312: The subscriber entity 300 accepts the SIM profile as valid only when the locally computed value matches the downloaded value.

Embodiments relating to further details of remote provisioning of a SIM profile to a subscriber entity 300 as performed by the subscriber entity 300 will now be disclosed.

As disclosed above, in some aspects, the provision of the SIM profile to the subscriber entity 300 is triggered by an explicit request for download of the SIM profile from the subscriber entity 300. That is, according to an embodiment, the subscriber entity 300 is configured to perform (optional) step S302:

S302: The subscriber entity 300 requests download of the SIM profile from the remote SIM provisioning server 100.

The SIM profile is then provided to the subscriber entity 300 and thus obtained by the subscriber entity 300 in S304 in response thereto. In other aspect the subscriber entity 300 does by itself not provide any explicit request for download of the SIM profile.

As disclosed above, there could be further data or information that is provided to the subscriber entity 300 together with the SIM profile in S304. For example, an ICCID of the SIM profile could be provided to the subscriber entity 300 together with the SIM profile. That is, according to an embodiment, the subscriber entity 300 is configured to perform (optional) step S304a as part of S304:

S304a: The subscriber entity 300 obtains an ICCID of the SIM profile from the remote SIM provisioning server 100 when downloading the SIM profile.

As will be disclosed below, the ICCID might be provided to the storage entity 200 in order for the subscriber entity 300 to be allowed to download the value of the key-value pair.

In some aspects, the subscriber entity 300 presents the key of the key-value pair in order to download the value of the key-value pair from the storage entity 200. That is, according to an embodiment, the subscriber entity 300 is configured to perform (optional) step S302:

S306: The subscriber entity 300 requests download of the value from the storage entity 200 by presenting the key of the key-value pair to the storage entity 200.

In some aspects the ICCID is used as credentials for the subscriber entity 300 to download the value of the key-value pair. In particular, according to an embodiment, the subscriber entity 300 is configured to perform (optional) step S308:

S308: The subscriber entity 300 provides the ICCID to the storage entity 200 in order to download the value of the key-value pair from the storage entity 200.

Figure 5:
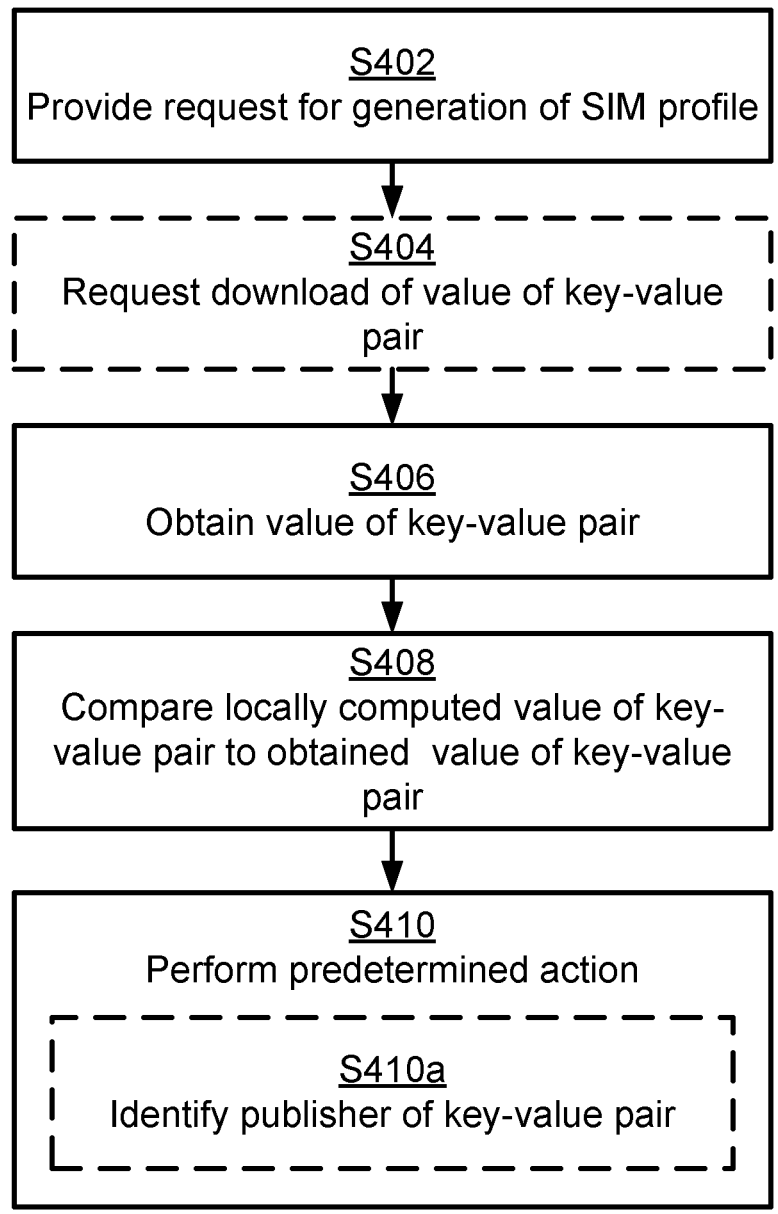

Reference is now made to FIG. 5 illustrating a method for remote provisioning of a SIM profile to a subscriber entity 300 as performed by the MNO entity 400 according to an embodiment.

S402: The MNO entity 400 provides a request to a remote SIM provisioning server 100 for generation of the SIM profile.

S406: The MNO entity 400 obtains a value of a key-value pair of the SIM profile from a storage entity 200 upon presenting the key of the key-value pair to the storage entity 200. As above, the key-value pair comprises a unique identifier comprising at least one profile specific element of the SIM profile as key and binding information of the at least one profile specific element as value. The unique identifier comprising at least one profile specific element of the SIM profile is represented by an ICCID of the SIM profile. The binding information of the at least one profile specific element is represented by an EID and profile/subscription unique data elements for the SIM profile.

S408: The MNO entity 400 compares another obtained or locally computed value of the key-value pair to the obtained value of the key-value pair.

S410: The MNO entity 400, when the another obtained or locally computed value is not identical to the obtained value, performs a predetermined action.

Embodiments relating to further details of remote provisioning of a SIM profile to a subscriber entity 300 as performed by the MNO entity 400 will now be disclosed.

There could be different ways for the MNO entity 400 to obtain the value of a key-value pair of the SIM profile from the storage entity 200 in S406. In some aspects the MNO entity 400 actively queries the storage entity 200 for new SIM profiles, for example by providing a range of ICCIDs to the storage entity 200. In other aspects the storage entity 200 publishes notifications of new log entries and upon being made aware of such a notification the MNO entity 400 could obtain the value of the key-value pair of the SIM profile upon presenting the key of the key-value pair to the storage entity 200.

There may be different predetermined actions for the MNO entity 400 to perform in S410. In some aspects the key-value pair is published by a publisher entity. The publisher entity might be a SM-DP+ entity and thus be represented by the remote SIM provisioning server 100. The storage entity 200 might record and store the (authenticated) identity of the publisher entity so that it can be used later to identify the publisher of a specific entry of the key-value pair. The MNO entity 400 might then identify the publisher entity when performing the predetermined action. That is, according to an embodiment, the MNO entity 400 is configured to perform (optional) step S410a as part of S410:

S410a: The MNO entity 400 identifies the publisher entity.

The MNO entity 400 could thereby verify that the entry recorded in the storage entity 200 matches the subscription that the MNO entity 400 has ordered the remote SIM provisioning server 100 to produce and download to the subscriber entity 300.

If the information received from the storage entity 200 does not match (i.e., when the another obtained or locally computed value is not identical to the obtained value) this means that the remote SIM provisioning server 100 (identified by the log entry) is not the same as the one the MNO entity 400 has ordered the subscription to be provided from. In turn, this is an indication of a malicious remote SIM provisioning server 100. In this case the MNO entity 400 might be configured to investigate further and potentially apply some consequences to the remote SIM provisioning server 100 if it turns out it has acted maliciously.

The key of the key-value pair might by the MNO entity 400 obtained from the remote SIM provisioning server 100 or be computed locally by the MNO entity 400.

As disclosed above, in some aspects, the value of the key-value pair is also provided to the MNO entity 400. This requires the MNO entity 400 to present the key of the key-value pair to the storage entity 200 for the storage entity 200 to provide the value of the key-value pair to the MNO entity 400. That is, according to an embodiment, the MNO entity 400 is configured to perform (optional) step S404:

S404: The MNO entity 400 requests download of the value from the storage entity 200 by presenting the key of the key-value pair to the storage entity 200.

Embodiments applicable for each of the remote SIM provisioning server 100, the storage entity 200, the subscriber entity 300, and the MNO entity 400 will now be disclosed.

There could be different examples of the key-value pair. According to an embodiment, the key-value pair comprises a hash of the EID and profile/subscription unique data elements for the SIM profile as value. In some examples, the hash of the EID and profile/subscription unique data elements for the SIM profile is provided as a hash of a pair, where the pair comprises an EID and a hash of profile/subscription unique data elements for the SIM profile. In some examples, the hash of the EID and profile/subscription unique data elements for the SIM profile is provided as a pair, where the pair comprises a hash of an EID and a hash of profile/subscription unique data elements for the SIM profile. In yet further examples the EID is provided without being hashed.

In summary, according to some examples, a record with ICCID as a key and the hash of the protected SIM profile (bound to a specific EID, and downloaded from the remote SIM provisioning server 100) and hash of EID as a value is stored by the storage entity 200. This binds an EID and bounded profile to a unique identifier (ICCID). The identity of the profile provisioner (i.e., the remote SIM provisioning server 100) is provided for each record stored by the storage entity 200. This identity is verified by the storage entity 200 through the authentication and secure session establishment that proceeds registering information in the storage entity 200. Only provisioners can write to the data structure and others (e.g., the MNO entity 400 and the subscriber entity 300) can only read from the storage entity 200. During the SIM profile download from the remote SIM provisioning server 100, the subscriber entity 300 locally computes a value using its own EID and downloaded profile content. Then, the subscriber entity 300 queries the storage entity 200 using the ICCID of the downloaded SIM profile. The subscriber entity 300 compares that the published value stored by the storage entity 200 matches against its own computation. A matched value guarantees to the subscriber entity 300 that the SIM profile is published in an auditable log and that it is bound to the subscriber entity 300. The ICCID is bound to the MNO entity 400 by the ICCID having a mobile network code (MNC) of the MNO entity 400 being part of each ICCID of the MNO entity 400.

Figure 6:
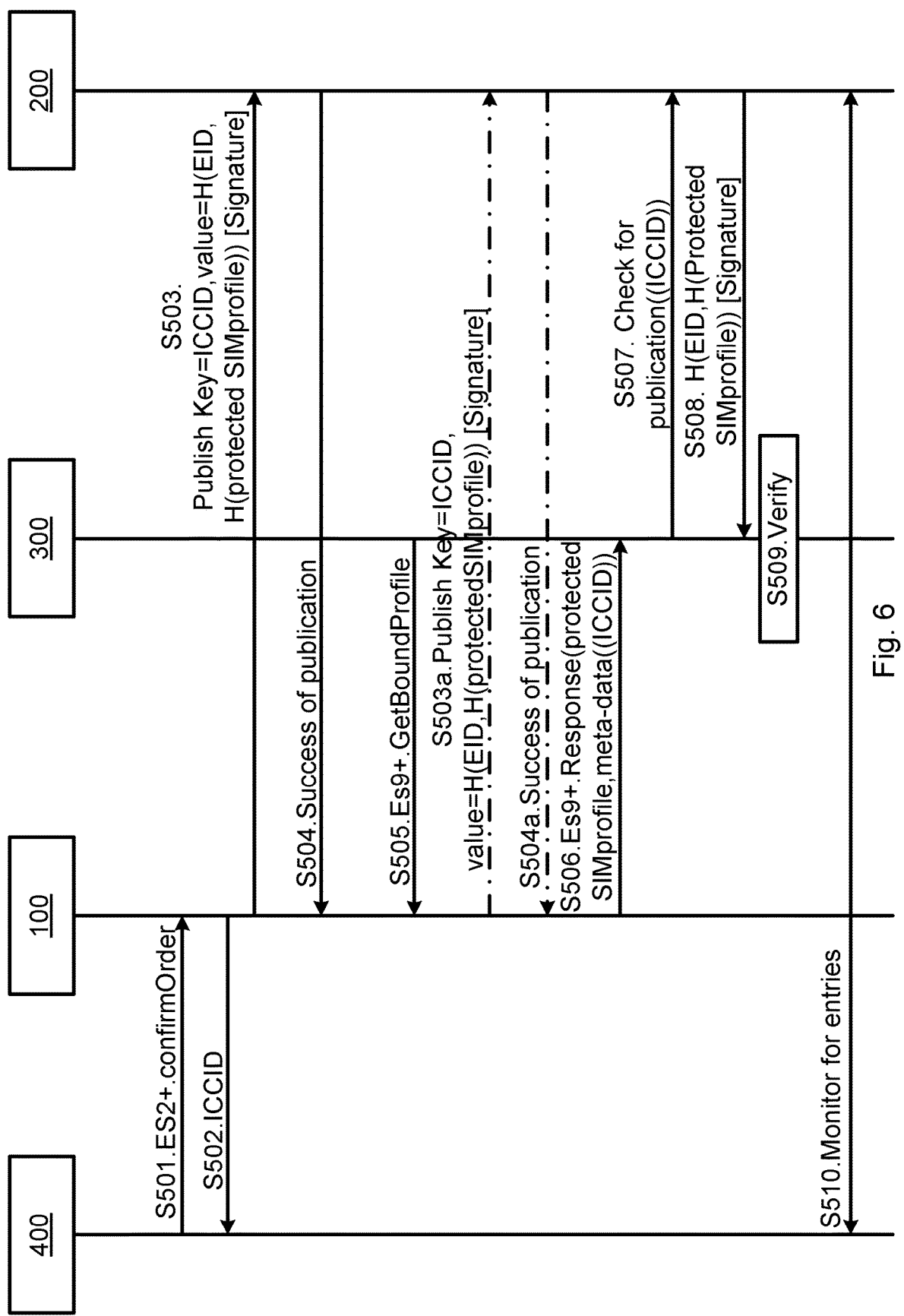
FIG. 6 is a signalling diagram according to an embodiment.

One particular embodiment for remote provisioning of a SIM profile to a subscriber entity 300 based on at least some of the above disclosed embodiments will now be disclosed in detail with reference to the signalling diagram of FIG. 6. In FIG. 6, the notation "[Signature]" in a message means that the message is digitally signed by the sender of the message.

S501: An MNO entity 400 orders/confirms a SIM profile to a remote SIM provisioning server 100. The SIM profile contains IMSI, ICCID, subscriber secrets and MNO parameters. A SIM profile is generated at the remote SIM provisioning server 100 and protected using a random key.

S502: The remote SIM provisioning server 100 returns the profile identifier (ICCID) of the generated SIM profile to the MNO entity 400.

S503: If an eUICC identity (EID) is provided during step S501 by the MNO entity 400, the remote SIM provisioning server 100 publishes H(EID, H(protected profile)) as a value for an ICCID as a key to the storage entity 200. Here 'H' implies a one way cryptographic hash function. If the EID is not known, this step occurs as S503a after S505. The ICCID as an index is unique per SIM profile and never repeated. Thus, there should not be any collusion for ICCID as key. This is taken care of by the storage entity 200.

S504: The remote SIM provisioning server 100 receives confirmation of success of publication of the SIM profile from the storage entity 200. This step only is performed after step S503 has been completed, and this if instead S503a is performed, this step occurs as S504a.

S505: The subscriber entity 300 requests downloading of the SIM profile from the remote SIM provisioning server 100. If S503 and S504 have not been performed, S503a and S504a are performed next. If the remote SIM provisioning server 100 learns the EID at this stage, the remote SIM provisioning server 100 bounds the SIM profile for the particular EID.

S506: The remote SIM provisioning server 100 sends the bounded SIM profile to the subscriber entity 300.

S507: The subscriber entity 300 decrypts the received SIM profile and prepares to install the SIM profile. Further, the subscriber entity 300 requests the publication state profile (i.e., the value of the key-value pair) from the storage entity 200 using the received ICCID as key.

S508: The subscriber entity 300 receives the publication result for the particular ICCID from the storage entity 200. The publication result contains profile binding information e.g., H(EID,H(protected SIM profile)).

S509: The subscriber entity 300 verifies the publication result. The subscriber entity 300 already knows its EID, and profile content from step S506. Thus, the subscriber entity 300 locally computes H(EID, H(protected SIM profile content)). This hash should match the value received from the storage entity 200. If there is a match it means that the remote SIM provisioning server 100 has registered this exact SIM profile to this exact subscriber entity 300. Any deviation of result triggers an error message to the user of the subscriber entity 300.

S510: The MNO entity 400 monitors the storage entity 200 for entries concerning the ICCID address space of the MNO entity 400 to verify that they are valid. This monitoring can be performed e.g. periodically or the storage entity 200 can send notifications to the MNO entity 400 whenever there is a new entry related to the specific MNO entity 400. The entry can be mapped to the MNO entity 400 by the MNC that is part of each ICCID and is unique for each MNO entity 400. Before the MNO entity 400 verifies an entry, a SIM profile installed on a subscriber entity 300 will be seem valid to the subscriber entity 300 (assuming the check performed by the subscriber entity 300 in S507-S508 was successful). Alternatively, the MNO entity 400 might keep the subscription in a locked state until the MNO entity 400 can verify from the storage entity 200 that the subscription has been registered correctly.

Aspects relating to auditability will now be disclosed.

The subscriber entity 300 checks the publication of a SIM profile in the storage entity 200 during SIM profile installation. This ensures that the subscriber entity 300 does not store, or take into use, SIM profiles without explicit publication at the storage entity 200. The subscriber entity 300 only accepts a SIM profile which has a publication targeted for the subscriber entity 300 in the storage entity 200. A malicious remote SIM provisioning server 100 can still create a malicious SIM profile (e.g., cloned or with e.g. invalid Ki) and bind it against an ICCID. A malicious remote SIM provisioning server 100 can publish such SIM profile bindings in the storage entity 200. This makes the SIM profile acceptable to the targeted subscriber entity 300. However, this creates a permanent record in the storage entity 200, linked to the malicious remote SIM provisioning server 100. The ICCID is an MNO controlled resource. An MNO entity 400 monitoring the storage entity 200 can compare the ICCID value published in the storage entity 200 with the one ordered by the MNO entity 400. If the storage entity 200 contains an unexpected ICCID belonging to an MNO range, this detects a malicious SIM profile attack performed by a malicious remote SIM provisioning server 100. On the other hand, if the remote SIM provisioning server 100 uses an ICCID not belonging to any MNO entity 400, i.e., a made up ICCID, the storage entity 200 will detect this. The storage entity 200 can be aware of accepted ICCID prefixes and only accept ICCIDs belonging to that group. The storage entity 200 implementation ensures each key is present only once and once entered, values for a key becomes immutable. This means that if a malicious remote SIM provisioning server 100 tries to re-use an ICCID, the storage entity 200 will block the request and log an event of duplicate entry attempt.

Aspects relating to data structures will now be disclosed.

The data structure is an immutable key value store where e.g. ICCID acts as a key and e.g. H(EID, H(protected SIM profile)) acts as a value. Here, the inclusion of EID in the value bounds the key ICCID to the subscriber entity 300 identified by the EID. The parameter H(protected SIM profile) bounds the target SIM profile content to the key ICCID. In addition to this, the identity of the remote SIM provisioning server 100, e.g. certificate or public key, of the remote SIM provisioning server 100 adding the entry, is stored to link the entry to the remote SIM provisioning server 100. The protected SIM profile is a Protected SIM profile Package (PPP) from the GSMA context. The PPP can be generated either using random key or session key depending on the procedure used i.e., if implementing S503 for publication, it should be random key based protection while if implementing S503a for publication then both the session key and a random-valued key can be used.

A centralized authenticated data structure, such as a certificate transparency log, or a decentralized structures such as blockchain, can act as an immutable audit record and be stored as a record in the storage entity 200. The data structure should provide immutability and append-only properties. In a stricter version, a centralized structure with binary prefix tree can be used where the ICCID act as a key. In this option, each ICCID forms a unique prefix path. Once the value is entered for a key, the value cannot be modified afterwards, thus ensuring immutability of data for a key.

Aspects relating to security will now be disclosed.

A remote SIM provisioning server 100 cannot target the same SIM profile to multiple subscriber entities 300. Each SIM profile publication contains the hash of the EID and the SIM profile as a value for an ICCID as the key. Thus, the publication is bound to an EID and this publication is only acceptable to the targeted subscriber entity 300. If a malicious remote SIM provisioning server 100 wants to retarget an existing publication, the malicious remote SIM provisioning server 100 has to change the EID which changes the publication hash value. Similarly, the same publication cannot be targeted for the same subscriber entity 300 multiple times. Each subscriber entity 300 maintains an internal register, which checks uniqueness of each SIM profile based on the ICCID value. Two SIM profiles with the same ICCID are not accepted by the subscriber entity 300.

A malicious remote SIM provisioning server 100 might create a new SIM profile (with new ICCID) by cloning a valid IMSI, or Ki (MNO subscriber keys, or complete SIM profile) from another SIM profile. To accept such SIM profiles, the malicious remote SIM provisioning server 100 publishes SIM profile binding against an ICCID in the storage entity 200. This creates a trace of an invalid ICCID (i.e., not agreed or order by the MNO entity 400) in the storage entity 200. An MNO entity 400 monitoring the storage entity 200 can detect such events by comparing against its own view (e.g., ICCIDs ordered by the MNO entity 400). However, until the MNO entity 400 checks entries from the storage entity 200, the maliciously installed/ provisioned SIM profile will be accepted by the subscriber entity 300, and it will be usable in the network of the MNO entity 400. The traceability of the ICCID for a SIM profile in the stored record deters a malicious remote SIM provisioning server 100 from publishing invalid SIM profiles. All log entries in the storage entity 200 are bound to the SM-DP+ that entered it, through either signature or recording which remote SIM provisioning server 100 was providing the entry over an authenticated connection.

Figure 7:
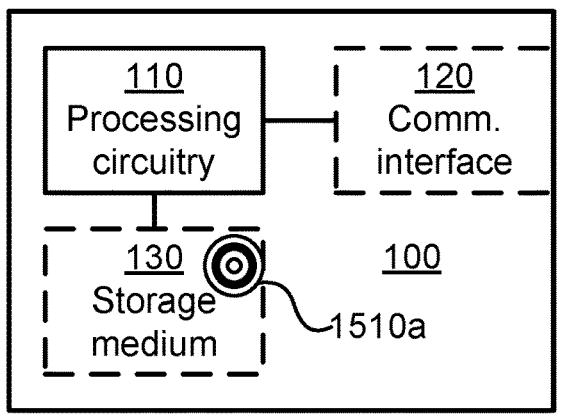
FIG. 7 is a schematic diagram showing functional units of a remote SIM provisioning server according to an embodiment.

FIG. 7 schematically illustrates, in terms of a number of functional units, the components of a remote SIM provisioning server 100 according to an embodiment. Processing circuitry 110 is provided using any combination of one or more of a suitable central processing unit (CPU), multiprocessor, microcontroller, digital signal processor (DSP), etc., capable of executing software instructions stored in a computer program product 1510a (as in FIG. 15), e.g. in the form of a storage medium 130. The processing circuitry 110 may further be provided as at least one application specific integrated circuit (ASIC), or field programmable gate array (FPGA).

Particularly, the processing circuitry 110 is configured to cause the remote SIM provisioning server 100 to perform a set of operations, or steps, as disclosed above. For example, the storage medium 130 may store the set of operations, and the processing circuitry 110 may be configured to retrieve the set of operations from the storage medium 130 to cause the remote SIM provisioning server 100 to perform the set of operations. The set of operations may be provided as a set of executable instructions. Thus the processing circuitry 110 is thereby arranged to execute methods as herein disclosed.

The storage medium 130 may also comprise persistent storage, which, for example, can be any single one or combination of magnetic memory, optical memory, solid state memory or even remotely mounted memory.

The remote SIM provisioning server 100 may further comprise a communications interface 120 for communications with other entities, nodes, functions, servers, and devices of the communication network in FIG. 1. As such the communications interface 120 may comprise one or more transmitters and receivers, comprising analogue and digital components.

The processing circuitry 110 controls the general operation of the remote SIM provisioning server 100 e.g. by sending data and control signals to the communications interface 120 and the storage medium 130, by receiving data and reports from the communications interface 120, and by retrieving data and instructions from the storage medium 130. Other components, as well as the related functionality, of the remote SIM provisioning server 100 are omitted in order not to obscure the concepts presented herein.

Figure 8:
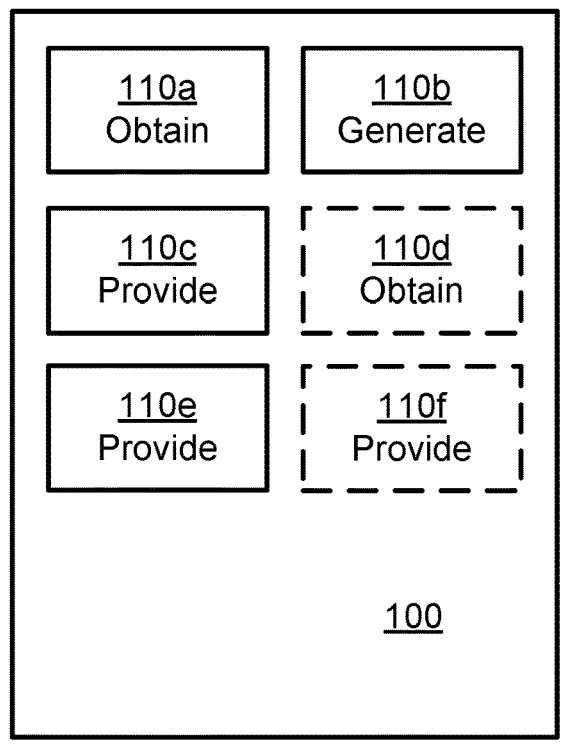
FIG. 8 is a schematic diagram showing functional modules of a remote SIM provisioning server according to an embodiment.

FIG. 8 schematically illustrates, in terms of a number of functional modules, the components of a remote SIM provisioning server 100 according to an embodiment. The remote SIM provisioning server 100 of FIG. 8 comprises a number of functional modules; an obtain module 110a configured to perform step S102, a generate module 110b configured to perform step S104, a provide module 110c configured to perform step S106, and a provide module 110e configured to perform step S110. The remote SIM provisioning server 100 of FIG. 8 may further comprise a number of optional functional modules, such as any of an obtain module 110d configured to perform step S108, and a provide module 110f configured to perform step S110a. In general terms, each functional module 110a-110f may be implemented in hardware or in software. Preferably, one or more or all functional modules 110a-110f may be implemented by the processing circuitry 110, possibly in cooperation with the communications interface 120 and the storage medium 130. The processing circuitry 110 may thus be arranged to from the storage medium 130 fetch instructions as provided by a functional module 110a-110f and to execute these instructions, thereby performing any steps of the remote SIM provisioning server 100 as disclosed herein.

Figure 9:
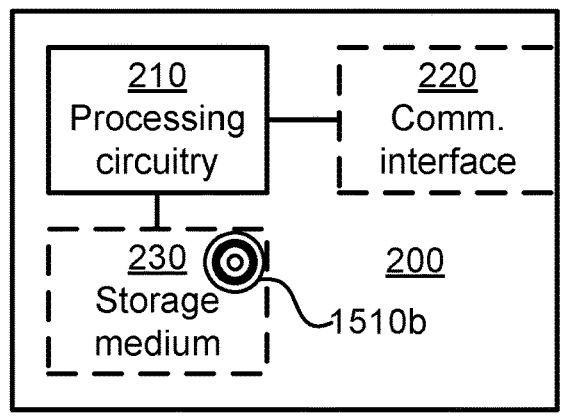
FIG. 9 is a schematic diagram showing functional units of a storage entity according to an embodiment.

FIG. 9 schematically illustrates, in terms of a number of functional units, the components of a storage entity 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1510b (as in FIG. 15), e.g. in the form of a storage medium 230. The processing circuitry 210 may further be provided as at least one application specific integrated circuit (ASIC), or field programmable gate array (FPGA).

Particularly, the processing circuitry 210 is configured to cause the storage entity 200 to perform a set of operations, or steps, as disclosed above. For example, the storage medium 230 may store the set of operations, and the processing circuitry 210 may be configured to retrieve the set of operations from the storage medium 230 to cause the storage entity 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The storage entity 200 may further comprise a communications interface 220 for communications with other entities, nodes, functions, servers, and devices of the communication network in FIG. 1. As such the communications interface 220 may comprise one or more transmitters and receivers, comprising analogue and digital components.

The processing circuitry 210 controls the general operation of the storage entity 200 e.g. by sending data and control signals to the communications interface 220 and the storage medium 230, by receiving data and reports from the communications interface 220, and by retrieving data and instructions from the storage medium 230. Other components, as well as the related functionality, of the storage entity 200 are omitted in order not to obscure the concepts presented herein.

Figure 10:
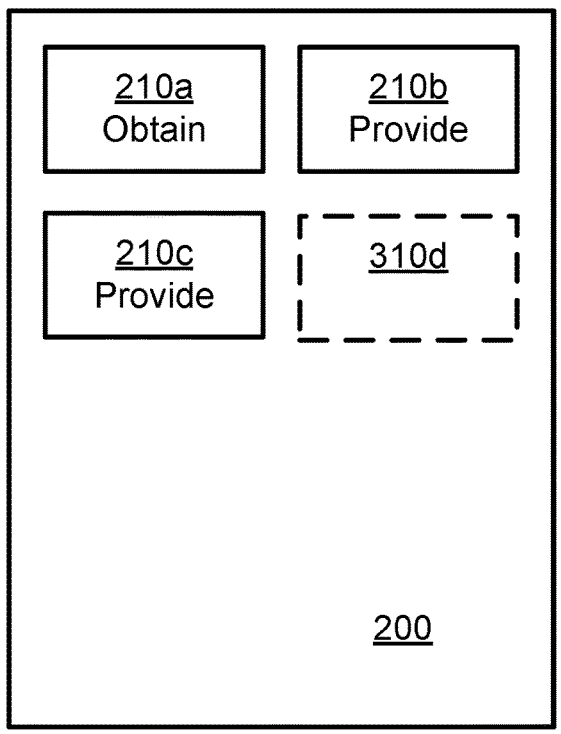
FIG. 10 is a schematic diagram showing functional modules of a storage entity according to an embodiment.

FIG. 10 schematically illustrates, in terms of a number of functional modules, the components of a storage entity 200 according to an embodiment. The storage entity 200 of FIG. 10 comprises a number of functional modules; an obtain module 210a configured to perform step S202, a provide module 210b configured to perform step S204, and a provide module 210c configured to perform step S206. The storage entity 200 of FIG. 10 may further comprise a number of optional functional modules, as represented by functional module 210d. In general terms, each functional module 210a-210d may be implemented in hardware or in software. Preferably, one or more or all functional modules 210a-210d may be implemented by the processing circuitry 210, possibly in cooperation with the communications interface 220 and the storage medium 230. The processing circuitry 210 may thus be arranged to from the storage medium 230 fetch instructions as provided by a functional module 210a-210d and to execute these instructions, thereby performing any steps of the storage entity 200 as disclosed herein.

Figure 11:
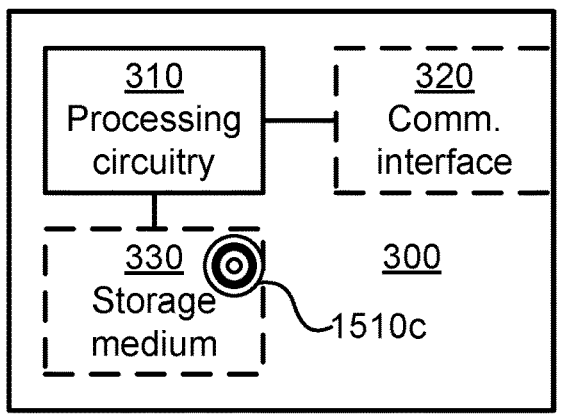
FIG. 11 is a schematic diagram showing functional units of a subscriber entity according to an embodiment.

FIG. 11 schematically illustrates, in terms of a number of functional units, the components of a subscriber entity 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1510c (as in FIG. 15), e.g. in the form of a storage medium 330. The processing circuitry 310 may further be provided as at least one application specific integrated circuit (ASIC), or field programmable gate array (FPGA).

Particularly, the processing circuitry 310 is configured to cause the subscriber entity 300 to perform a set of operations, or steps, as disclosed above. For example, the storage medium 330 may store the set of operations, and the processing circuitry 310 may be configured to retrieve the set of operations from the storage medium 330 to cause the subscriber entity 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The subscriber entity 300 may further comprise a communications interface 420 for communications with other entities, nodes, functions, servers, and devices of the communication network in FIG. 1. As such the communications interface 420 may comprise one or more transmitters and receivers, comprising analogue and digital components.

The processing circuitry 410 controls the general operation of the subscriber entity 300 e.g. by sending data and control signals to the communications interface 420 and the storage medium 430, by receiving data and reports from the communications interface 420, and by retrieving data and instructions from the storage medium 430. Other components, as well as the related functionality, of the subscriber entity 300 are omitted in order not to obscure the concepts presented herein.

Figure 12:
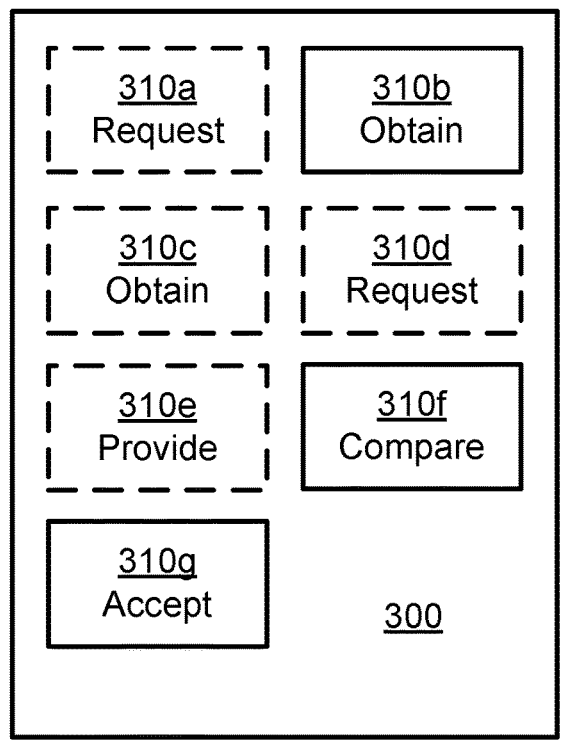
FIG. 12 is a schematic diagram showing functional modules of a subscriber entity according to an embodiment.

FIG. 12 schematically illustrates, in terms of a number of functional modules, the components of a subscriber entity 300 according to an embodiment. The subscriber entity 300 of FIG. 12 comprises a number of functional modules; an obtain module 310b configured to perform step S304, a compare module 310f configured to perform step S310, and an accept module 310g configured to perform step S312. The subscriber entity 300 of FIG. 12 may further comprise a number of optional functional modules, such as any of a request module 310a configured to perform step S302, an obtain module 310c configured to perform step S304a, a request module 310d configured to perform step S306, and a provide module 310e configured to perform step S308. In general terms, each functional module 310a-310g may be implemented in hardware or in software. Preferably, one or more or all functional modules 310a-310g may be implemented by the processing circuitry 310, possibly in cooperation with the communications interface 320 and the storage medium 330. The processing circuitry 310 may thus be arranged to from the storage medium 330 fetch instructions as provided by a functional module 310a-310g and to execute these instructions, thereby performing any steps of the subscriber entity 300 as disclosed herein.

Figure 13:
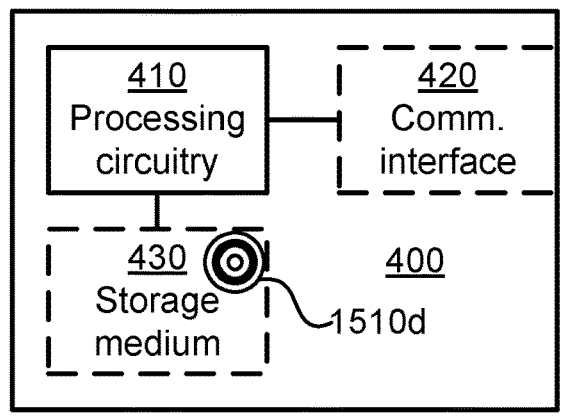
FIG. 13 is a schematic diagram showing functional units of an MNO entity according to an embodiment.

FIG. 13 schematically illustrates, in terms of a number of functional units, the components of an MNO entity 400 according to an embodiment. Processing circuitry 410 is provided using any combination of one or more of a suitable central processing unit (CPU), multiprocessor, microcontroller, digital signal processor (DSP), etc., capable of executing software instructions stored in a computer program product 1510d (as in FIG. 15), e.g. in the form of a storage medium 430. The processing circuitry 410 may further be provided as at least one application specific integrated circuit (ASIC), or field programmable gate array (FPGA).

Particularly, the processing circuitry 410 is configured to cause the MNO entity 400 to perform a set of operations, or steps, as disclosed above. For example, the storage medium 430 may store the set of operations, and the processing circuitry 410 may be configured to retrieve the set of operations from the storage medium 430 to cause the MNO entity 400 to perform the set of operations. The set of operations may be provided as a set of executable instructions. Thus the processing circuitry 410 is thereby arranged to execute methods as herein disclosed.

The storage medium 430 may also comprise persistent storage, which, for example, can be any single one or combination of magnetic memory, optical memory, solid state memory or even remotely mounted memory.

The MNO entity 400 may further comprise a communications interface 420 for communications with other entities, nodes, functions, servers, and devices of the communication network in FIG. 1. As such the communications interface 420 may comprise one or more transmitters and receivers, comprising analogue and digital components.

The processing circuitry 410 controls the general operation of the MNO entity 400 e.g. by sending data and control signals to the communications interface 420 and the storage medium 430, by receiving data and reports from the communications interface 420, and by retrieving data and instructions from the storage medium 430. Other components, as well as the related functionality, of the MNO entity 400 are omitted in order not to obscure the concepts presented herein.

Figure 14:
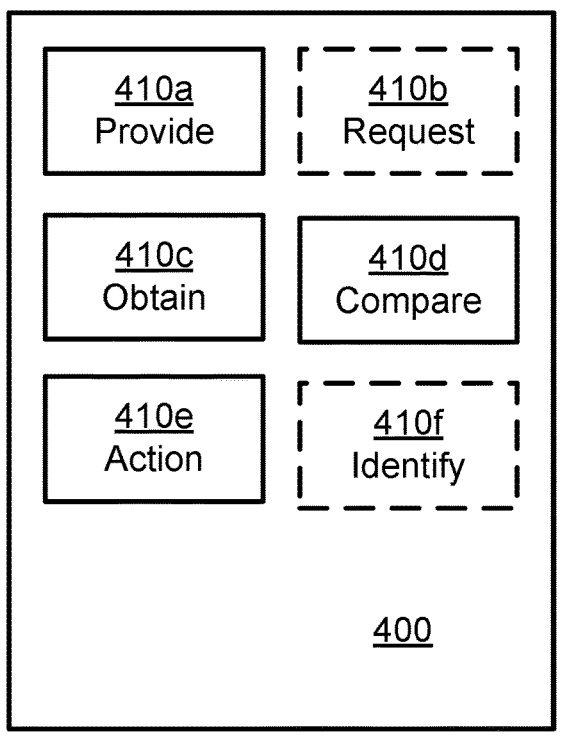
FIG. 14 is a schematic diagram showing functional modules of an MNO entity according to an embodiment.

FIG. 14 schematically illustrates, in terms of a number of functional modules, the components of an MNO entity 400 according to an embodiment. The MNO entity 400 of FIG. 14 comprises a number of functional modules; a provide module 410a configured to perform step S402, an obtain module 410c configured to perform step S406, a compare module 410d configured to perform step S408, and an action module 410e configured to perform step S410. The MNO entity 400 of FIG. 14 may further comprise a number of optional functional modules, such as any of a request module 410b configured to perform step S404, and an identify module 410f configured to perform step S410a. In general terms, each functional module 410a-410f may be implemented in hardware or in software. Preferably, one or more or all functional modules 410f may be implemented by the processing circuitry 410, possibly in cooperation with the communications interface 420 and the storage medium 430. The processing circuitry 410 may thus be arranged to from the storage medium 430 fetch instructions as provided by a functional module 410f and to execute these instructions, thereby performing any steps of the MNO entity 400 as disclosed herein.

Figure 15:
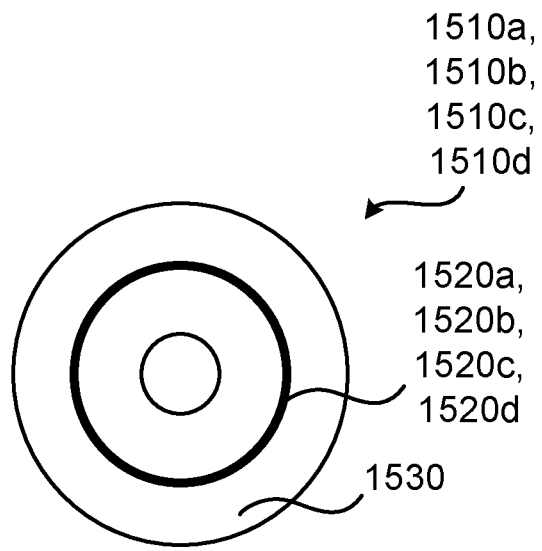
FIG. 15 shows one example of a computer program product comprising computer readable means according to an embodiment.

FIG. 15 shows one example of a computer program product 1510a, 151a, 1510c, 1510d comprising computer readable means 1530. On this computer readable means 1530, a computer program 1520a can be stored, which computer program 1520a can cause the processing circuitry no and thereto operatively coupled entities and devices, such as the communications interface 120 and the storage medium 130, to execute methods according to embodiments described herein. The computer program 1520a and/or computer program product 1510a may thus provide means for performing any steps of the remote SIM provisioning server 100 as herein disclosed. On this computer readable means 1530, a computer program 1520b can be stored, which computer program 1520b can cause the processing circuitry 210 and thereto operatively coupled entities and devices, such as the communications interface 220 and the storage medium 230, to execute methods according to embodiments described herein. The computer program 1520b and/or computer program product 1510b may thus provide means for performing any steps of the storage entity 200 as herein disclosed. On this computer readable means 1530, a computer program 1520c can be stored, which computer program 1520c can cause the processing circuitry 410 and thereto operatively coupled entities and devices, such as the communications interface 420 and the storage medium 430, to execute methods according to embodiments described herein. The computer program 1520c and/or computer program product 1510c may thus provide means for performing any steps of the subscriber entity 300 as herein disclosed. On this computer readable means 1530, a computer program 1520d can be stored, which computer program 1520c can cause the processing circuitry 410 and thereto operatively coupled entities and devices, such as the communications interface 420 and the storage medium 430, to execute methods according to embodiments described herein. The computer program 1520d and/or computer program product 1510d may thus provide means for performing any steps of the MNO entity 400 as herein disclosed.

In the example of FIG. 15, the computer program product 1510a, 151a, 1510c, 1510d is illustrated as an optical disc, such as a CD (compact disc) or a DVD (digital versatile disc) or a Blu-Ray disc. The computer program product 1510a, 151a, 1510c could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1520a, 1520b, 1520c, 1520d is here schematically shown as a track on the depicted optical disk, the computer program 1520a, 1520b, 1520c, 1520d can be stored in any way which is suitable for the computer program product 1510a, 151a, 1510c, 1510d.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for remote provisioning of a subscriber identity module (SIM) profile to a subscriber entity, the method being performed by a remote SIM provisioning server, the method comprising:
   obtaining a request from a mobile network operator (MNO) entity for generation of the SIM profile;
   generating the SIM profile;
   providing, to a storage entity in a first message, a key-value pair of the SIM profile, the key-value pair comprising a unique identifier comprising at least one profile specific element of the SIM profile as key and hashed binding information of the at least one profile specific element as value, wherein the unique identifier comprising at least one profile specific element of the SIM profile is represented by an integrated circuit card identifier (ICCID) of the SIM profile, and wherein the hashed binding information of the at least one profile specific element is represented by an embedded universal integrated circuit card (eUICC) identity (EID) and profile/subscription unique data elements for the SIM profile comprising a subscriber identifier, a subscriber key, and an operator key, wherein the storage entity is a server, wherein the storage entity, the subscriber entity, the MNO entity, and the remote SIM provisioning server are each separate entities from one another, and wherein the storage entity, the MNO entity, and the SIM provisioning server are each entities of a combined core network and service network; and
   providing, to the subscriber entity requesting download of the SIM profile in a second message, the SIM profile, wherein binding information that is not hashed included in the SIM profile received by the subscriber entity from the remote SIM provisioning server is used to verify the hashed binding information provided to the storage entity,
   wherein the first message does not comprise the binding information that is not hashed and the second message does not comprise the hashed binding information.

2. The method according to claim 1, further comprising: obtaining, from the subscriber entity, a request for download of the SIM profile.

3. The method according to claim 1, further comprising: providing, to the subscriber entity, an ICCID of the SIM profile when providing the SIM profile.

4. The method according to claim 1, wherein the remote SIM provisioning server is an enhanced Subscription Manager Data Preparation (SM-DP+) entity.

5. The method according to claim 1, wherein the key-value pair comprises a hash of the EID and the profile/subscription unique data elements for the SIM profile as value.

6. The method according to claim 5, wherein the hash of the EID and the profile/subscription unique data elements for the SIM profile is provided as a hash of a pair, the pair comprising the EID and a hash of the profile/subscription unique data elements for the SIM profile.

7. The method according to claim 6, wherein the hash of the EID and the profile/subscription unique data elements for the SIM profile is provided as a pair, the pair comprising a hash of the EID and a hash of the profile/subscription unique data elements for the SIM profile.

8. A method for remote provisioning of a SIM profile to a subscriber entity, the method being performed by a storage entity, the method comprising:
   obtaining, from a remote SIM provisioning server in a first message, a key-value pair of the SIM profile, the key-value pair comprising a unique identifier comprising at least one profile specific element of the SIM profile as key and of hashed binding information of the at least one profile specific element as value, wherein the unique identifier comprising at least one profile specific element of the SIM profile is represented by an integrated circuit card identifier (ICCID) of the SIM profile, and wherein the hashed binding information of the at least one profile specific element is represented by an embedded universal integrated circuit card (eUICC) identity (EID) and profile/subscription unique data elements for the SIM profile comprising a subscriber identifier, a subscriber key, and an operator key; and
   providing, to the subscriber entity presenting the key of the key-value pair in a second message, the value of the key-value pair, wherein the storage entity is a server, wherein binding information that is not hashed included in the SIM profile received by the subscriber entity from the remote SIM provisioning server is used to verify the hashed binding information obtained by the storage entity, wherein the storage entity, the subscriber entity, and the remote SIM provisioning server are each separate entities from one another, and wherein the storage entity and the SIM provisioning server are each entities of a combined core network and service network,
   wherein the first message does not comprise the binding information that is not hashed and the second message does not comprise the binding information that is not hashed.

9. The method according to claim 8, further comprising: providing, to a mobile network operator (MNO) entity presenting the key of the key-value pair, the value of the key-value pair, wherein the MNO entity is a separate entity from each of the storage entity, the subscriber entity, and the remote SIM provisioning server, and wherein the MNO entity is an entity of the combined core network and service network.

10. A method for remote provisioning of a subscriber identity module (SIM) profile to a subscriber entity, the method being performed by the subscriber entity, the method comprising:

obtaining, from a remote SIM provisioning server in a first message, the SIM profile upon requesting download of the SIM profile; and comparing a locally computed value of a key-value pair of the SIM profile to a value of the key-value pair as downloaded from a storage entity in a second message, the key-value pair comprising a unique identifier comprising at least one profile specific element of the SIM profile as key and hashed binding information of the at least one profile specific element as value, wherein the unique identifier comprising at least one profile specific element of the SIM profile is represented by an integrated circuit card identifier (ICCID) of the SIM profile, and wherein the hashed binding information of the at least one profile specific element is represented by an embedded universal integrated circuit card (eUICC) identity (EID) and profile/subscription unique data elements for the SIM profile comprising a subscriber identifier, a subscriber key, and an operator key; and accepting the SIM profile as valid only when the locally computed value matches the downloaded value, wherein the storage entity is a server, wherein binding information that is not hashed included in the SIM profile obtained by the subscriber entity from the remote SIM provisioning server is used to verify the hashed binding information downloaded from the storage entity, wherein the storage entity, the subscriber entity, the MNO entity, and the remote SIM provisioning server are each separate entities from one another, and wherein the storage entity, the MNO entity, and the SIM provisioning server are each entities of a combined core network and service network, wherein the first message does not comprise the hashed binding information and the second message does not comprise the binding information that is not hashed.

11. The method according to claim 10, further comprising:
requesting download of the SIM profile from the remote SIM provisioning server.

12. The method according to claim 10, further comprising:
obtaining an ICCID of the SIM profile from the remote SIM provisioning server when downloading the SIM profile.

13. The method according to claim 10, further comprising:
requesting download of the value from the storage entity by presenting the key of the key-value pair to the storage entity.

14. The method according to claim 10, further comprising:
providing the ICCID to the storage entity in order to download the value of the key-value pair from the storage entity.

15. The method according to claim 10, wherein the subscriber entity is an integrated universal integrated circuit card (iUICC) or an embedded universal integrated circuit card (eUICC).

16. A method for remote provisioning of a subscriber identity module (SIM) profile to a subscriber entity, the method being performed by a mobile network operator (MNO) entity, the method comprising:
providing a request to a remote SIM provisioning server for generation of the SIM profile;

obtaining a value of a key-value pair of the SIM profile from a storage entity in a message upon presenting the key of the key-value pair to the storage entity, the key-value pair comprising at least one profile specific element of the SIM profile as key and hashed binding information of the at least one profile specific element as value, wherein the unique identifier comprising at least one profile specific element of the SIM profile is represented by an integrated circuit card identifier (ICCID) of the SIM profile, and wherein the hashed binding information of the at least one profile specific element is represented by an embedded universal integrated circuit card (eUICC) identity (EID) and profile/subscription unique data elements for the SIM profile comprising a subscriber identifier, a subscriber key, and an operator key; and comparing another obtained or locally computed value of the key-value pair to the obtained value of the key-value pair, wherein binding information that is not hashed included in a SIM profile from the remote SIM provisioning server is used to verify the hashed binding information downloaded from the storage entity; and when said another obtained or locally computed value is not identical to the obtained value:
performing a predetermined action, wherein the storage entity, the subscriber entity, the MNO entity, and the remote SIM provisioning server are each separate entities from one another, and wherein the storage entity, the MNO entity, and the SIM provisioning server are each entities of a combined core network and service network, and wherein the message does not comprise the binding information that is not hashed.

17. The method according to claim 16, wherein the key-value pair is published by a publisher entity, and wherein performing the predetermined action comprises:
identifying the publisher entity.

18. The method according to claim 16, wherein the key is obtained from the remote SIM provisioning server or computed locally by the MNO entity.

19. The method according to claim 16, further comprising:
requesting download of the value from the storage entity by presenting the key of the key-value pair to the storage entity.

20. The method according to claim 16, further comprising monitoring the storage entity to verify that entries concerning an ICCID address space of the MNO entity are valid.

* * * * *